Patented Nov. 8, 1938

2,135,641

UNITED STATES PATENT OFFICE 2,135,641

ESTERS OF C-DIALKYLGLYCINES

Ralph Albert Jacobson, Wilmington, Del., assignor to E. I. du Pont de Nemours & Company, Wilmington, Del., a corporation of Delaware No Drawing. Application August 5, 1936, Serial No. 94,467

11 Claims. (Cl. 260—482)

This invention relates to esters of aliphatic acids and more particularly to esters of certain substituted glycines, which esters are particularly suited for use as plasticizers.

Glycine is a well known amino acid of the formula $NH_2$—$CH_2COOH$. Substituted glycines, in which one of the methylene hydrogens is replaced by an alkyl group (i. e., C-alkylglycines) are also known. Many esters of glycine and C-alkylglycines have been prepared heretofore but, due to their instability and tendency to be converted to diketopiperazine derivatives, they are not particularly suited for use as plasticizers. The methyl and ethyl esters of C-dimethylglycine are also known, but they too are unstable and have found no particular use in the arts.

This invention has an object the preparation of new, stable esters of glycines in which both methylene hydrogen atoms are replaced by monovalent hydrocarbon radicals, and in which the amino hydrogens may optionally be replaced by such radicals. A further object is the preparation of higher alcohol esters of C-dialkylglycines. Another object is the preparation of esters of the formula

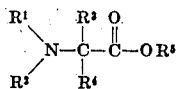

wherein $R^1$ and $R^2$ are hydrogen or monovalent hydrocarbon radicals, $R^3$ and $R^4$ are monovalent hydrocarbon radicals, and $R^5$ is the radical of an alcohol having at least four carbon atoms. A further object is the preparation of higher alcohol esters of certain amino aliphatic acids, which esters are stable, water-resistant, of low volatility, and compatible to a satisfactory degree with cellulose derivatives, particularly cellulose acetate. Other objects will be apparent from the subsequent description.

These objects are accomplished by the following invention wherein an alcohol of at least four and preferably at least eight carbon atoms is reacted with an acid of the formula

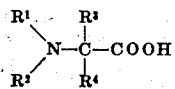

(wherein $R^1$ and $R^2$ are hydrogen or monovalent hydrocarbon radicals, and $R^3$ and $R^4$ are monovalent hydrocarbon radicals), or with a nitrile, halide, anhydride, or an ester thereof with a more volatile alcohol. The objects of the invention are attained in another way by hydrolysis of the nitrile of an acid of the formula just given in the presence of an alcohol having the stated minimum carbon content. When the acid is reacted with the alcohol, an esterification catalyst such as hydrogen chloride may be employed. Where a lower alcohol ester of the acid is reacted with the higher alcohol, an ester interchange catalyst such as litharge is preferably employed.

The substituted glycines used as starting materials in one form of the present invention may be prepared in any suitable manner, for example, by hydrolysis of the appropriate nitrile or the appropriate 5,5-dialkylhydantoin, directions for these methods being included in the examples which follow. Reference may also be made to Bucherer & Lieb, Journ. prakt Chem. 141 5 (1934); Cocker & Lapworth, J. Chem. Soc. 1391 (1931); Bucherer & Grolee, Ber. 39 986 (1906); Organic Syntheses Collective Volume I, page 292, and Organic Syntheses Collective Volume I, page 20, for suitable methods for making the substituted glycines used herein.

The substituted glycine acid halides, anhydrides, and esters with volatile alcohols, used in other modifications of the invention, may be prepared from the acid by conventional methods.

The nitriles of substituted glycines which are used in a further embodiment of the invention are obtainable by reacting the appropriate ketone cyanhydrin with ammonia or mines.

Since the object of this invention is primarily the preparation of stable esters of the type described herein, I employ only the C-disubstituted glycines and for the esterification thereof only those alcohols which contain at least four carbon atoms. The relative stability of these compounds seems to be related both to the doubly substituted alpha-carbon of the acid and to the number of carbon atoms in the alcohol with which the amino acid is esterified. Satisfactory stability is not obtained with esters in which the alcohol of the ester group contains only one or two carbon atoms. The substitution of an aryl group for one of the hydrogens on the nitrogen of a C-dialkylglycine ester also results in increased stability toward anhydride formation.

Having thus outlined the principles and objects of the invention, the following exemplifications thereof are added in illustration and not in limitation.

EXAMPLE I

*n-Octyl ester of C-dimethylglycine*

A solution of 142.5 parts of 5,5-dimethylhydantoin (prepared by warming acetone cynhydrin with ammonium carbonate solution) in 587 parts of 60% sulfuric acid was gently refluxed for twenty-four hours. Seven hundred and sixty-three (763) parts of barium carbonate was then slowly added, after which steam was passed into the reaction vessel (heated on a steam bath) until ammonia was no longer evolved. The mixture was next made acid to Congo with sulfuric acid, the solid product which formed then being filtered off and washed several times with hot water. The filtrate and washings were combined and concentrated to about 100 parts. Basic lead carbonate was then added thereto until effervescence ceased and the mixture was no longer acid to Congo but was still acid to litmus. The lead sulfate was removed by filtration and washed with hot water, the filtrate and washings being subsequently concentrated until crystallization of the C-dimethylglycine began. The yield from this and succeeding crops amounted to 98 parts or 76% of the theoretical.

Hydrogen chloride was passed into a suspension of 50 parts of C-dimethylglycine in 827 parts of n-octyl alcohol until the increase in weight amounted to 85 parts. The mixture was gently warmed for 8 hours, during which time the solid dissolved. The excess alcohol was recovered by vacuum distillation and the ester hydrochloride was obtained as a solid cake. Crystallization of a portion of the product from butyl acetate gave white crystals of the amino ester hydrochloride melting at 84°–85° C. The main portion of the product was treated in the cold in the presence of ether with a 50% solution of potassium hydroxide. The ether layer was separated, dried with magnesium sulfate, and distilled, 93.4 parts or a yield of 87% of the octyl ester of C-dimethylglycine being obtained therefrom. This ester was a colorless liquid boiling at 95°–96° C. under 2 mm. pressure. It was insoluble in water but soluble in dilute acids. It had the following additional properties:

$d_4^{20}$ 0.8918 and $N_D^{20}$ 1.4340

Example II

*Dodecyl ester of C-dimethylglycine*

A solution of 84 parts of C-dimethylglycinenitrile (prepared in 77% yield by treating acetone cyanhydrin with liquid ammonia for several days, drying over caustic potash and distilling) in 1225 parts of 40% sulfuric acid was refluxed gently for eight hours. The solution was then treated with an excess of barium carbonate and subsequently processed as in the first step of Example I. The yield of C-dimethylglycine was 72 parts or 70% of the theoretical.

Dry hydrogen chloride was passed into a suspension of 206 parts of C-dimethylglycine in 2232 parts of n-dodecyl alcohol until the increase in weight amounted to 278 parts, after which the mixture was heated on a hot plate for eight hours. The excess dodecyl alcohol was removed by distillation (B. P. 125° C. under 6 mm. pressure) and upon cooling the residual liquid solidified. Crystallization of a small portion of this material from butyl acetate gave pure white crystals of the amino ester hydrochloride melting at 95° C. The main portion of the hydrochloride (470 parts) was suspended in hot butyl acetate and the mixture filtered. The white hydrochloride was suspended in distilled water, a small amount of ether added, and strong potassium hydroxide solution added until the mixture was alkaline. The ether layer was dried overnight with magnesium sulfate, filtered and distilled. The n-dodecyl ester of C-dimethylglycine was obtained as a colorless, practically odorless liquid boiling at 130°–132° C. under 2 mm. pressure. The yield was 325 parts or 78.3% of the theoretical. Other properties were as follows:

$N_D^{20}$ 1.4429 and $d_4^{20}$ 0.8832

Analysis of the ester indicated the presence of 5.98% nitrogen, the theoretical nitrogen content being 5.17%.

Example III

*Isobutyl ester of C-dimethylglycine*

Dry hydrogen chloride was passed into a suspension of 103 parts of C-dimethylglycine in 746 parts of well-cooled isobutanol until the increase in weight amounted to 236 parts. The reaction mixture was gently refluxed for eight hours. The excess isobutanol was removed by distillation and the hydrochloride of the ester obtained as a white crystalline solid. Upon crystallization from butyl acetate, the hydrochloride of the ester melted at 102°–103° C.

The hydrochloride was treated with 40% potassium hydroxide solution in the presence of ether and the ether layer separated. A second extraction was made with ether, and the combined extracts dried with magnesium sulfate and distilled. A small amount of isobutanol and water distilled first and then the isobutyl ester boiling at 60°–61° C. at 4 mm. was obtained. The yield was 104 parts or 65.5% of the theoretical. The product was a colorless liquid with a slightly unpleasant ammoniacal odor of $N_D^{20}$ 1.4210 and $d_4^{20}$ 0.9082

Analysis indicated that the ester contained 9.13% nitrogen, the theoretical nitrogen content being 8.80%.

Example IV

*Isobutyl ester of N-phenyl-C-dimethylglycine*

Into a large jar were placed 1600 parts of N-phenyl-C-dimethylglycinenitrile and 9600 parts of concentrated hydrochloric acid. The mixture was allowed to digest on a hot plate at 90°–100° C. for fifteen hours, during which time the N-phenyl-C-dimethylglycinenitrile went into solution. Upon cooling, a large amount of crystalline material separated. Water was added to dissolve the crystals, and the solution was made exactly neutral with 15% sodium hydroxide solution. The N-phenyl-C-dimethylglycine separated as a voluminous white precipitate. The product was washed several times with water and after drying weighed 1104 parts which amounts to 61.9% of the theoretical. The product melted at 182°–184° C.

A mixture of 1135 parts of N-phenyl-C-dimethylglycine and 4699 parts of isobutanol was placed in a large vessel surrounded by ice. Dry hydrogen chloride was passed into the mixture until the increase in weight amounted to 1034 parts. The mixture was gently refluxed on a hot plate for twelve hours. The inert suspended material was filtered off and the filtrate distilled at atmospheric pressure until the excess isobutanol had been removed. The ester hydrochloride was treated with 30% potassium hydroxide solution, the mixture extracted with ether and the ether extract dried with magnesium sulfate. After removal of the ether, the isobutyl ester of N-phenyl-C-dimethylglycine was distilled at reduced pressure and obtained as a slightly yellowish liquid, boiling at 130°–135° C. at 3–4 mm. pressure. The yield was 1300 parts or 87.4% of the theoretical. Other properties were $N_D^{20}$ 1.5082 and $d_4^{20}$ 1.0072

Analysis indicated that the ester contained 71.87% carbon and 9.07% hydrogen as compared to theoretical values of 71.52% and 8.94% respectively.

In a similar manner, other esters of N-phenyl-C-dimethylglycine, such as the octyl and dodecyl esters, may be prepared by substituting the appropriate alcohol, e. g., n-octanol-n-dodecanol, etc., for the isobutanol in Example IV.

EXAMPLE V

Octyl ester of N-phenyl-C-dimethylglycine

A mixture of 75 parts of N-phenyl-C-dimethylglycine (0.42 mol) and 684 parts (5.3 mols) of octyl alcohol was treated with dry hydrogen chloride until the increase in weight was 88 parts (2.4 mols). The mixture was heated on a hot plate at 120–125° C. for 8 hours and the excess octyl alcohol was removed by distillation under reduced pressure. The residual mass was cooled with ice and made alkaline with 10% potassium hydroxide solution. The upper layer separating out and containing the amino esters was removed, the residual layer extracted with ether, and the combined ether extract and separated portion dried with magnesium sulfate and distilled in vacuo. The n-octyl ester of N-phenyl-C-dimethylglycine thus obtained was a colorless liquid boiling at 167–169° C. and 1.5 mm. pressure. The yield was 104 parts or 85.4% of the theoretical. Other properties were $N_D^{20}$ 1.4999 and $d_4^{20}$ 0.9722

Analysis indicated that the product contained 5.16% nitrogen, the theoretical amount being 4.81%.

EXAMPLE VI

Octyl ester of C-methyl-C-ethylglycine

A mixture of 146.3 parts (1.25 mols) of C-methyl-C-ethylglycine and 690 parts (5.3 mols) of n-octyl alcohol was treated with 135.7 parts (3.7 mols) of dry hydrogen chloride. The reaction mixture was then heated on a hot plate at 120°–125° C. until the hydrochloride of the ester dissolved, and the excess octyl alcohol was removed by distillation under reduced pressure. The residual hydrochloride was next neutralized with 10% potassium hydroxide while the mixture was cooled in an ice bath. The upper layer separating out and containing the amino ester was removed, the residual liquid extracted with ether, and the combined ether extract and separated portion dried with magnesium sulfate and distilled in vacuo. The n-octyl ester of C-methyl-C-ethylglycine thus obtained was a colorless liquid boiling at 98°–100° C. at 1 mm. pressure. The yield was 163 parts or 71.3% of the theoretical. Other properties were $N_D^{20}$ 1.4380 and $d_4^{20}$ 0.8941

Analysis indicated that the product contained 6.43% nitrogen (the theoretical being 6.04% nitrogen).

In a similar manner the dodecyl and isobutyl esters may be prepared by substituting dodecyl alcohol and isobutanol, respectively, for the n-octyl alcohol in the above example.

So far as is known, any substituted glycine of the formula previously given may be employed in carrying out the invention. In the examples, C-dimethylglycine, C-methyl-C-ethylglycine, and N-phenyl-C-dimethylglycine have been employed as typical, but similar results may be obtained with others, among them C-diethylglycine, N-dimethyl-C-dimethylglycine, N-diethyl-C-diethylglycine, N-methyl-C-dimethylglycine, N-ethyl-C-dimethylglycine, N-benzyl-C-dimethylglycine, C-di-isopropylglycine, etc.

In order to insure sufficient stability in the ester the alcohol employed for the esterification of the substituted glycine should contain at least four and preferably at least eight carbon atoms. So far as is known any alcohol having this minimum carbon content may be employed. The alcohol for example may be straight or branched chain; aliphatic, aromatic, heterocyclic, or alicyclic; saturated or unsaturated; monohydric or polyhydric; and primary, secondary, or tertiary, though the ease of esterification, as is generally true for all acids, is in the order named. In the examples, n-octyl, n-dodecyl, and isobutyl alcohols have been used as typical. Others may be employed, however, with similar results, among them n-butyl, secondary-butyl, n-amyl, n-tetradecyl, n-octadecyl, cetyl, carnaubyl, 9,10-octadecenyl, methallyl, crotyl, cyclohexyl, benzyl, p-tolyl, β-phenylethyl, furfuryl, and β-methoxyethyl alcohols; also diethylene glycol, trimethylene glycol, mono- and dialkyl ethers of glycerol, pentaerythritol, and sorbitol. The longer chain aliphatic alcohols such as octyl, dodecyl and cetyl are particularly useful in this invention because the esters prepared from them are not only relatively non-volatile and therefore more useful as plasticizers for cellulose derivatives, etc., but are also less sensitive to water than the lower esters.

Any of the amino acids given above may be esterified with any of the alcohols specified. A large number of esters may thus be prepared. Although the proportions of acids and alcohols to be esterified may be varied as described, there would be no point in using less than stoichiometric proportions of alcohol (i. e., one mol of monohydric alcohol or the corresponding quantities of polyhydric alcohol per mol of amino acid). A considerable excess of alcohol is preferably used in order to promote more nearly complete esterification and to serve as a solvent for the rest of the reaction mixture. Mixtures of the amino acids and alcohols described herein can be used if desired.

Esterification catalysts other than hydrogen chloride can be used in the preparation of the new esters, e. g., sulfuric acid, other dry hydrohalides, para-toluenesulfonic acid, or other aryl sulfonic acids, etc. In some cases, catalysts may be dispensed with altogether. The esters may also be prepared by other methods. For example, instead of starting with the free amino acids, the corresponding amino nitrile may be hydrolyzed directly to the ester in the presence of the desired alcohol and of a mineral acid such as hydrogen chloride. Such methods for preparing esters are well known to those skilled in the art.

Supplementary anhydrous and non-reactive solvents other than the alcohol to be esterified, e. g., hydrocarbons and ethers, may be used in the reaction mixture if desired, but solvents other than the alcohol do not generally aid in the esterification. The temperature of reaction will vary according to the other reaction conditions. In esterifying very reactive alcohols, only moderate heating or perhaps none at all may be required, while other alcohols may require longer heating at higher temperatures. The selection of the proper temperature is a matter of simple test.

Maximum yields of the esters described herein can be obtained by using a considerable excess of alcohol and by allowing the reaction to continue until as much of the acid has been esterified as is practicable. The time required will vary more or less with the alcohol to be esterified, the catalyst, the temperature, etc. The examples illustrate the range of reaction conditions which will ordinarily produce the desired results. The reactions may be carried out under superatmospheric pressure if desired. When a solvent is present, the use of an automatic device for condensing solvent and water, separating, and returning solvent to reaction vessel is often desirable.

Since a series of esters of the type described herein may be prepared with a considerable range of properties depending upon the alcohol used for esterification as well as upon the nature of the substituent groups on the alpha-carbon and the amino nitrogen atoms of the acid, the invention affords a means of providing esters which are applicable for many purposes. The higher alkyl esters of C-dialkylglycines, for example, are especially useful as plasticizers and solvents for cellulose derivatives such as cellulose acetate. The somewhat lower alkyl esters such as the octyl ester of C-dimethylglycine, for example, are especially useful as solvents for cellulose acetate and protein-formaldehyde resins such as those derived from zein and formaldehyde. The octyl ester of C-dimethylglycine also possesses unique selectivity as a flotation agent for the separation of iron ore from quartz. The esters of N-aryl-C-dialkylglycines also possess excellent solvent and plasticizing properties. The esters as a class are remarkable stabilizers or anti-acids for substances which slowly deteriorate on aging with the liberation of acids. For example, the esters are excellent stabilizers for chlorinated rubber, rubber hydrochloride, and halogen-containing solvents and resins such as trichloroethylene, vinyl chloroacetate, vinyl chloride, etc. The hydrohalides of many of the esters such as the octyl and dodecyl esters of C-dimethylglycine are detergents in acid solutions.

The esters described herein are superior to those disclosed in the prior art for the above and other uses in that they are more stable and less volatile. They have, for example, less tendency to undergo cyclization with the formation of anhydrides or diketopiperazine derivatives. Such cyclization is illustrated by the following equation, in which R is the radical of an alcohol.

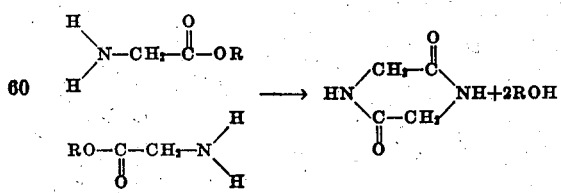

This tendency to cyclization takes place to a greater or less extent when the ester contains one or two methylene hydrogens or when R contains one or two carbon atoms, and thus precludes the use of such esters as solvents and for other purposes requiring a reasonable degree of stability. The higher esters of C-dialkyl glycines are more stable. For example, the isobutyl, octyl and dodecyl esters of C-dimethylglycine have been found to form only traces of anhydrides upon standing at laboratory temperatures for many months, whereas the methyl and ethyl esters of C-dimethylglycine very soon form very large amounts of anhydride under such conditions. The marked increase in the stability of the higher esters over the methyl ester is illustrated in the following table which summarizes the amounts of anhydride obtained on prolonged heating.

| Ester | Conditions of heating | | Percent of anhydride formed |
|---|---|---|---|
| | Temperature | Time | |
| | °C. | | |
| Methyl ester of C-dimethylglycine. | 230–240 | Prolonged heating. | 34.0 |
| Isobutyl ester of C-dimethylglycine. | 177–179 | 22 hours | 0.91 |
| Octyl ester of N-phenyl-C-dimethylglycine. | 210–220 | 22 hours | None |
| Octyl ester of C-methyl-C-ethylglycine. | 210–220 | 22 hours | 0.56 |

The longer chain esters are also more compatible with cellulose acetate than are ordinary aliphatic esters having an equal chain length. The octyl ester of C-dimethylglycine, for example is compatible with cellulose acetate in all proportions whereas most octyl esters of non-nitrogen-containing acids are incompatible with this cellulose derivative. The esters described herein are also obtainable from readily available raw materials.

The above description and examples are intended to be illustrative only. Any modification of or variation therefrom which conforms to the spirit of the invention is intended to be included within the scope of the claims.

I claim:
1. Process of preparing esters which comprises reacting an alcohol of at least four carbon atoms with a member of the class consisting of acids of the formula

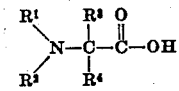

(wherein $R^1$ and $R^2$ are selected from the class consisting of hydrogen and monovalent hydrocarbon radicals and $R^3$ and $R^4$ are monovalent hydrocarbon radicals), nitriles, anhydrides, and halides thereof, and esters thereof with more volatile alcohols.

2. Process of preparing esters which comprises reacting an alcohol of at least four carbon atoms with an acid of the formula

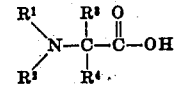

wherein $R^1$ and $R^2$ are selected from the class consisting of hydrogen and monovalent hydrocarbon radicals and $R^3$ and $R^4$ are monovalent hydrocarbon radicals.

3. An ester of the formula

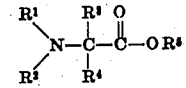

wherein $R^1$ and $R^2$ are selected from the class consisting of hydrogen and monovalent hydrocarbon radicals, $R^3$ and $R^4$ are monovalent hydrocarbon radicals, and $R^5$ is the radical of an alcohol of at least four carbon atoms.

4. An ester of a C-dialkylglycine with an alcohol of at least four carbon atoms.

5. An ester of a C-dimethylglycine with an alcohol of at least four carbon atoms.

6. An ester of a C-ethyl-C-methylglycine with an alcohol of at least four carbon atoms.

7. An ester of C-dialkylglycine having at least one amino hydrogen replaced by a hydrocarbon radical with an alcohol of at least four carbon atoms.

8. An ester of C-dimethylglycine having at least one amino hydrogen replaced by a hydrocarbon radical with an alcohol of at least four carbon atoms.

9. Process of preparing esters which comprises reacting an alcohol of at least four carbon atoms with a member of the class consisting of acids of the formula

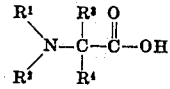

wherein $R^1$ and $R^2$ are selected from the group consisting of hydrogen lower alkyl, phenyl, and benzyl groups and $R^3$ and $R^4$ are alkyl radicals, nitriles, anhydrides, and halides thereof, and esters thereof with more volatile alcohols.

10. Process of preparing esters which comprises reacting an alcohol of at least four carbon atoms with an acid of the formula

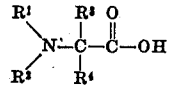

wherein $R^1$ and $R^2$ are selected from the group consisting of hydrogen lower alkyl, phenyl, and benzyl groups and $R^3$ and $R^4$ are alkyl radicals.

11. An ester of the formula

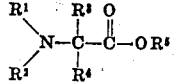

wherein $R^1$ and $R^2$ are selected from the group consisting of hydrogen lower alkyl, phenyl, and benzyl groups, $R^3$ and $R^4$ are alkyl radicals, and $R^5$ is the radical of an alcohol of at least four carbon atoms.

RALPH A. JACOBSON.